United States Patent
Koide

(10) Patent No.: US 11,650,571 B2
(45) Date of Patent: May 16, 2023

(54) CONTROL DEVICE, CONTROL METHOD, AND CONTROL PROGRAM FOR EXECUTING A MACHINING PROGRAM USING FLAG INDICATIONS

(71) Applicant: FANUC CORPORATION, Yamanashi (JP)

(72) Inventor: Naoya Koide, Yamanashi (JP)

(73) Assignee: Fanuc Corporation, Yamanashi (JP)

(*) Notice: Subject to any disclaimer, the term of this patent is extended or adjusted under 35 U.S.C. 154(b) by 0 days.

(21) Appl. No.: 16/402,771

(22) Filed: May 3, 2019

(65) Prior Publication Data

US 2019/0354086 A1 Nov. 21, 2019

(30) Foreign Application Priority Data

May 17, 2018 (JP) .............................. JP2018-095329

(51) Int. Cl.
G05B 19/4155 (2006.01)

(52) U.S. Cl.
CPC ............. *G05B 19/4155* (2013.01); *G05B 2219/35519* (2013.01)

(58) Field of Classification Search
CPC ...... G05B 19/4155; G05B 2219/35519; G05B 19/4067; G05B 19/19; G05B 2219/33127
See application file for complete search history.

(56) References Cited

U.S. PATENT DOCUMENTS

| 7,174,226 B2 * | 2/2007 | Nakazato | G05B 19/19 700/159 |
| 2003/0090230 A1 * | 5/2003 | Fujibayashi | G05B 19/19 318/625 |

(Continued)

FOREIGN PATENT DOCUMENTS

| DE | 69224007 | 7/1998 |
| DE | 102010038466 | 2/2011 |

(Continued)

OTHER PUBLICATIONS

Office Action dated May 19, 2021 in German Patent Application No. 102019205693.8.

*Primary Examiner* — Kenneth M Lo
*Assistant Examiner* — Tameem D Siddiquee
(74) *Attorney, Agent, or Firm* — Wenderoth, Lind & Ponack, L.L.P.

(57) ABSTRACT

To provide a control device, a control method and a control program that enables normal restart of the execution of a machining program. A numerical controller includes an execution control unit configured to execute a machining program for controlling operation of a machine tool from a designated block, a start processing unit configured to set, when a subsequence called from a predetermined block in the machining program is started, a flag indicating that the subsequence is under execution, and a termination processing unit configured to reset the flag following termination of the subsequence. When the execution control unit is instructed, following interruption of execution of the machining program, to restart the machining program from a block succeeding the predetermined block, if the flag is set, the execution control unit suspends the execution of the machining program.

10 Claims, 4 Drawing Sheets

(56) References Cited

U.S. PATENT DOCUMENTS

| | | | |
|---|---|---|---|
| 2005/0055126 A1* | 3/2005 | Genma | G05B 19/4068 700/181 |
| 2011/0208346 A1* | 8/2011 | Nagano | G05B 19/409 700/159 |
| 2013/0310974 A1* | 11/2013 | Iwata | G05B 19/4067 700/245 |
| 2013/0331956 A1* | 12/2013 | Kasuya | G05B 19/4155 700/11 |
| 2014/0012408 A1* | 1/2014 | Haga | G05B 19/4067 700/159 |
| 2015/0227133 A1 | 8/2015 | Kurohara | |
| 2016/0209825 A1* | 7/2016 | Murakawa | G05B 19/4068 |
| 2016/0306333 A1* | 10/2016 | Shimizu | G05B 19/0428 |
| 2016/0327929 A1 | 11/2016 | Chebroux et al. | |

FOREIGN PATENT DOCUMENTS

| | | |
|---|---|---|
| DE | 102010036618 | 4/2011 |
| JP | 4-88507 | 3/1992 |
| JP | 5-162047 | 6/1993 |
| JP | 8-286717 | 11/1996 |
| JP | 9-282019 | 10/1997 |
| JP | 2001-22421 | 1/2001 |
| JP | 2002-91521 | 3/2002 |
| JP | 2002-373008 | 12/2002 |
| JP | 2009-110223 | 5/2009 |
| JP | 2015-153063 | 8/2015 |
| JP | 2016-157393 | 9/2016 |
| JP | 2016-224533 | 12/2016 |

\* cited by examiner

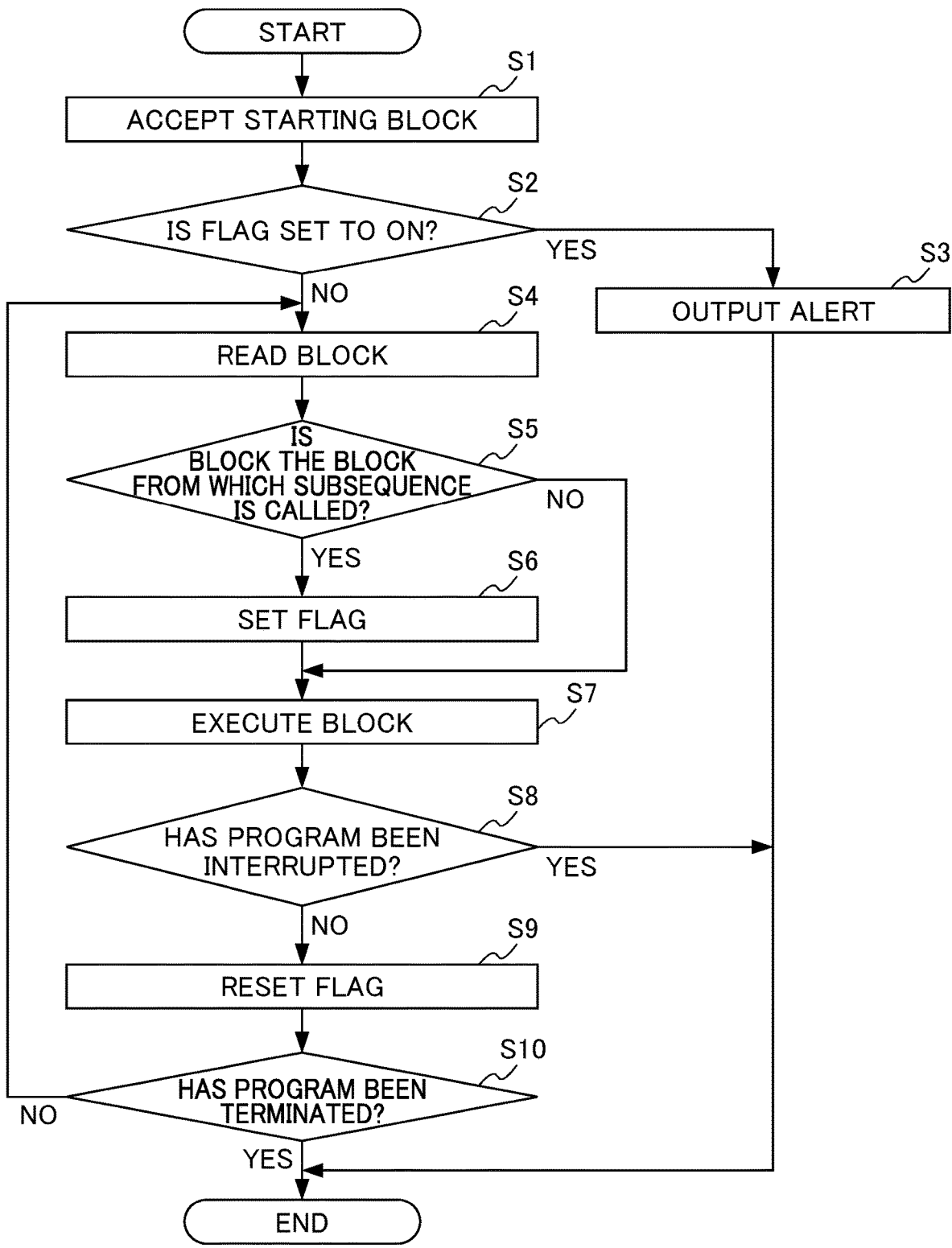

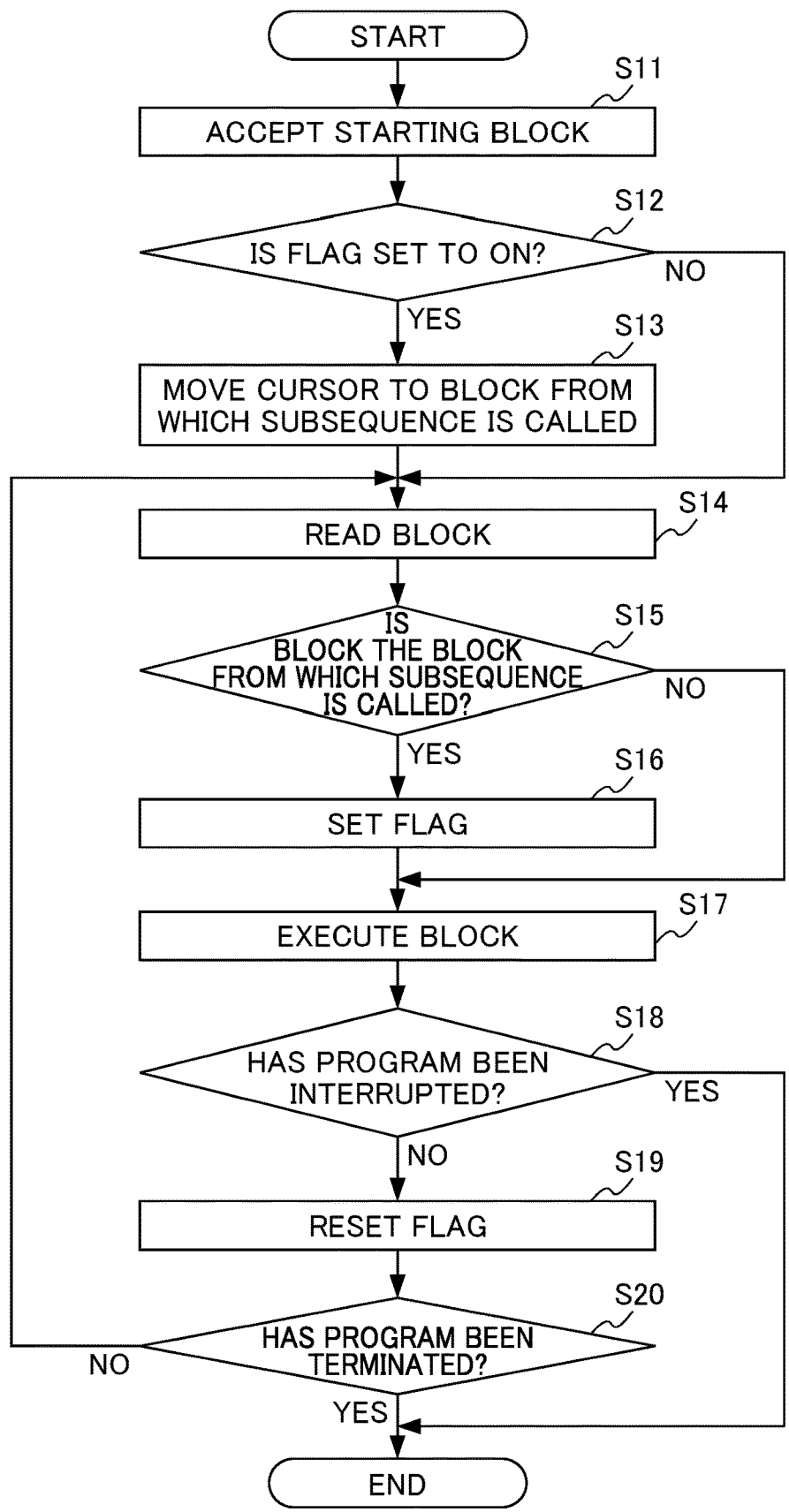

CONTROL DEVICE, CONTROL METHOD, AND CONTROL PROGRAM FOR EXECUTING A MACHINING PROGRAM USING FLAG INDICATIONS

This application is based on and claims the benefit of priority from Japanese Patent Application No. 2018-95329, filed on 17 May 2018, the content of which is incorporated herein by reference.

BACKGROUND OF THE INVENTION

Field of the Invention

The present invention relates to a control device, a control method and a control program for executing a machining program.

Related Art

A machine tool operates in response to various types of commands from a numerical controller. The numerical controller controls a series of operations of the machine tool by executing a machining program describing these commands.

If the execution of the machining program is interrupted due to a failure of the machine, operation by an operator, or the like, the execution of the program may be restarted after interruption such as manual operation. In this case, in order to avoid a situation where the program is restarted from a position different from that intended by the operator, a function is provided with which a confirmation message is displayed when the machining program is restarted with a cursor positioned at a block midway in the machining program.

Further, if there is an interruption such as manual operation while the machining program is interrupted, the state of the machine upon interruption of the machining program may be different from that upon restart of the machining program. In this case, since normal processing cannot be expected if the machining program is restarted from the interrupted position, such a technique as in Patent Document 1 and Patent Document 2 is proposed, wherein an alert is output when position information is not normal.

Patent Document 1: Japanese Unexamined Patent Application, Publication No. 2015-153063

Patent Document 2: Japanese Unexamined Patent Application, Publication No. 2002-91521

SUMMARY OF THE INVENTION

A machining program includes a main program as well as a subsequence of subprogram, an execution macro, or the like, called from a block in the main program. Since the execution state of the subsequence is usually not visible to an operator, in cases where the execution of the machining program is interrupted, it has been difficult to determine whether or not the operation by the subsequence has been completed. Therefore, there has been a risk that the machining program may be restarted from a wrong position.

The object of the present invention is to provide a control device, a control method and a control program enabling normal restart of the execution of a machining program.

(1) A control device (such as a numerical controller 1 to be described later) according to the present invention includes an execution control unit (such as an execution control unit 111 to be described later) configured to execute a machining program for controlling operation of a machine tool from a designated block, a start processing unit (such as a start processing unit 112 to be described later) configured to set, when a subsequence called from a predetermined block in the machining program is started, a flag indicating that the subsequence is under execution, and a termination processing unit (such as a termination processing unit 113 to be described later) configured to reset the flag following termination of the subsequence. When the execution control unit is instructed, following interruption of execution of the machining program, to restart the machining program from a block succeeding the predetermined block, if the flag is set, the execution control unit suspends the execution of the machining program.

(2) In the control device according to (1), the start processing unit may regard start of execution of the predetermined block as the start of the subsequence and set the flag.

(3) in the control device according to (1), the start processing unit may set the flag upon detection of execution of a predetermined code in the subsequence.

(4) In the control device according to any one of (1) to (3), the termination processing unit may regard normal termination of the predetermined block as the termination of the subsequence, and may reset the flag.

(5) In the control device according to any one of (1) to (3), the termination processing unit may reset the flag when execution of a predetermined code in the subsequence is detected.

(6) In the control device according to any one of (1) to (5), when the execution control unit is instructed to restart the machining program, if the flag is set, the execution control unit may output an alert indicating that the subsequence is not terminated yet.

(7) In the control device according to any one of (1) to (6), when the execution control unit is instructed to restart the machining program, if the flag is set, the execution control unit may automatically execute the machining program from the predetermined block from which the subsequence is called.

(8) In the control device according to any one or (1) to (7), the flag may be provided for each block in the machining program, and when the execution control unit is instructed to restart the machining program, if the flag associated with a block preceding the designated block is set, the execution control unit may suspend the execution of the machining program.

(9) In a control method to be executed by a computer (such as a numerical controller 1 to be described later), the control method includes the steps of: an execution control step of executing a machining program for controlling operation of a machine tool from a designated block, a start processing step of setting, when a subsequence called from a predetermined block in the machining program is started, a flag indicating that the subsequence is under execution, and a termination processing step of resetting the flag following termination of the subsequence in the execution control step, when an instruction is issued, following interruption of execution of the machining program, to restart the machining program from a block succeeding the predetermined block, if the flag is set, the execution of the machining program is suspended.

(10) A control program according to the present invention is intended for making a computer (such as a numerical controller 1 to be described later) execute the steps of: an execution control step of executing a machining program for controlling operation of a machine tool from a designated block, a start processing step of setting, when a subsequence called from a predetermined block in the machining program is started, a flag indicating that the subsequence is under execution, and a termination processing step of resetting the flag following termination of the subsequence, wherein in the execution control step, when it is instructed, following interruption of execution of the machining program, to restart the machining program from a block succeeding the predetermined block, if the flag is set, the execution of the machining program is suspended.

The present invention enables to normally restart the execution of a machining program.

BRIEF DESCRIPTION OF THE DRAWINGS

FIG. 4 is a first flowchart illustrating a control method to be executed by the numerical controller according to the present embodiment.

FIG. 5 is a second flowchart illustrating a control method to be executed by the numerical controller according to the present embodiment.

DETAILED DESCRIPTION OF THE INVENTION

One example of an embodiment of the present invention will be described below. In the present embodiment, a numerical controller 1 newly including various types of functions to be described below is illustrated as a control device of a machine tool.

Figure 1:
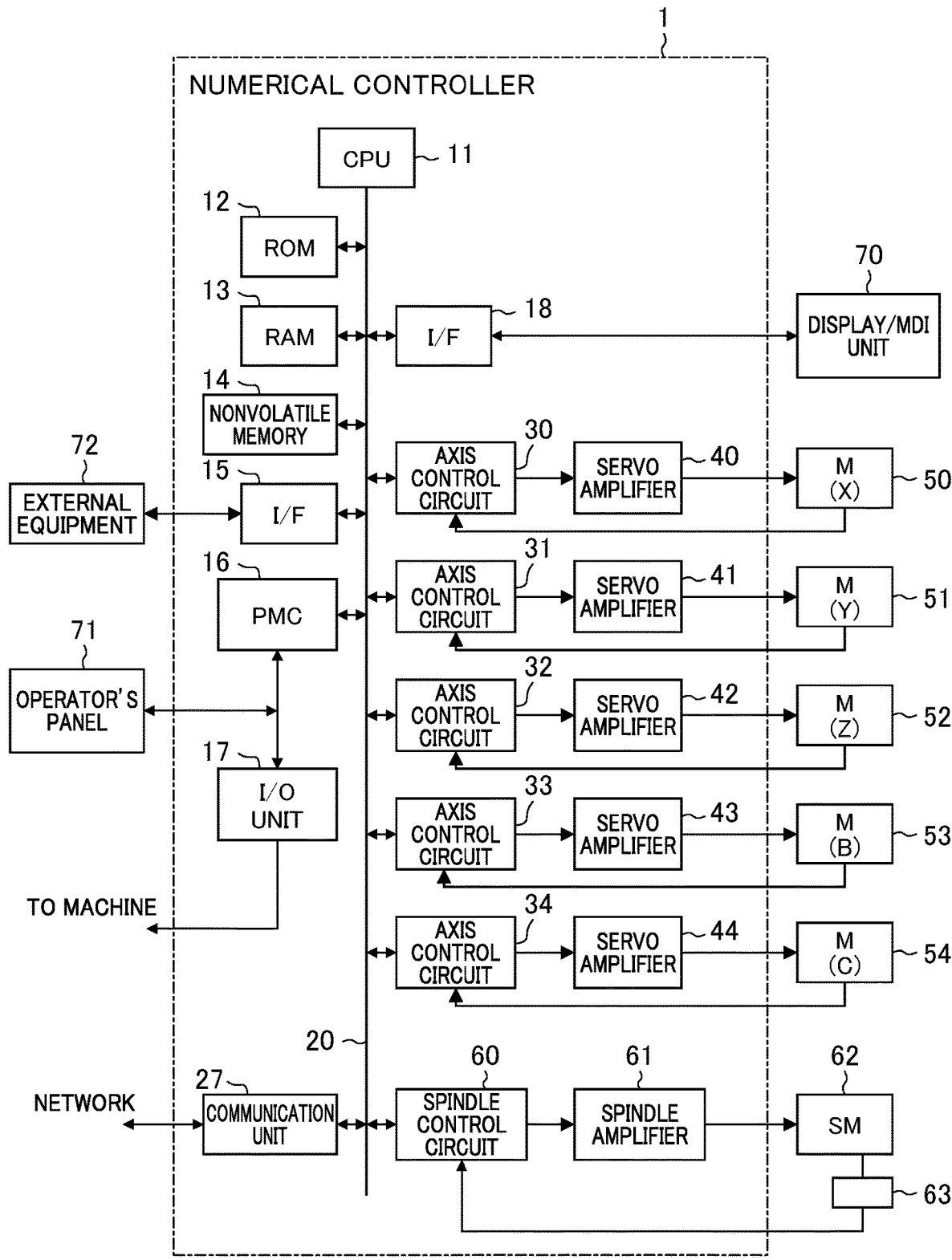
FIG. 1 is a block diagram illustrating the hardware configurations of principal portions of a numerical controller according to the present embodiment.

FIG. 1 is a block diagram illustrating the hardware configurations of principal portions of the numerical controller 1 according to the present embodiment. The numerical controller 1 includes a CPU 11 as a processor that controls the entire numerical controller 1. The CPU 11 reads a system program stored in a ROM 12 through a bus 20 and controls the entire numerical controller 1 by following the read system program. A RAM 13 stores temporary calculated data, display data, and various types of data input by an operator through a display/MDI unit 70. Generally, access is made faster to a RAM than to a ROM. Thus, the CPU 11 may deploy the system program stored in the ROM 12 in advance on the RAM 13. Then, the CPU 11 may read the system program from the RAM 13 and execute the read system program. A nonvolatile memory 14 is a magnetic storage unit, a flash memory, an MRAM, FRAM, or an EEPROM, for example. Alternatively, the nonvolatile memory 14 is an SRAM or a DRAM backed up by a battery, for example. The nonvolatile memory 14 is configured as a nonvolatile memory to hold its storage state even after the numerical controller 1 is powered off. The nonvolatile memory 14 stores a machining program, etc. input through an interface 15, the display/MDI unit 70, or a communication unit 27.

The ROM 12 stores various system programs written in advance for executing processing in an edit mode required for generation and editing of a machining program and for executing processing for automatic operation. Various machining programs are input through the interface 15, the display/MDI unit 70, or the communication unit 27, and are stored into the nonvolatile memory 14. The interface 15 connects between the numerical controller 1 and external equipment 72. A machining program, various parameters, etc., are read from the external equipment 72 into the numerical controller 1. The machining program edited in the numerical controller 1 can be stored into an external storage through the external equipment 72. Specific examples of the interface 15 include an RS232C interface, a USB, an SATA interface, a PC card slot, a CF card slot, an SD card slot, Ethernet, and Wi-Fi. The interface 15 can be located on the display/MDI unit 70. Examples of the external equipment 72 include a computer, a USB memory, a CFast card, a CF card, and an SD card.

A programmable machine controller (PEC) 16 outputs a signal through an I/O unit 17 to an auxiliary device (such as an automatic tool change device) of a machine tool to control the auxiliary device by following a sequence program provided in the numerical controller 1. The PMC 16 accepts signals input through various switches, etc. of an operator's panel 71 arranged at the body of the machine tool, executes necessary signal processing, and transfers the processed signals to the CPU 11. Generally, the PMC 16 is also called a programmable logic controller (PLC). The operator's panel 71 is connected to the PEC 16. The operator's panel 71 may include a manual pulse generator, for example. The display/MDI unit 70 is a manual data input unit with a d splay 701 (display unit) and an operation unit such as a keyboard or a touch panel 702. An interface 18 is used for transmitting screen data to be displayed to the display 701 of the display/MDI unit 70. The interface 18 is also used for receiving a command and data from the operation unit of the display/MDI unit 70 and transferring the received command and data to the CPU 11.

Axis control circuits 30 to 34 of corresponding axes receive movement command amounts of the corresponding axes given from the CPU 11, and output the commands on the corresponding axes to servo amplifiers 40 to 44 respectively. In response to receipt of these commands, the servo amplifiers 40 to 44 drive servo motors 50 to 54 of the corresponding axes respectively. The servo motors 50 to 54 of the corresponding axes each include a built-in position and speed detector. The servo motors 50 to 54 transmit position and speed feedback signals as feedbacks to the axis control circuits 30 to 34 respectively, thereby exerting position and speed feedback control.

A spindle control circuit 60 outputs a spindle speed signal to a spindle amplifier 61 in response to receipt of a spindle rotation command directed to the machine tool. In response to receipt of the spindle speed signal, the spindle amplifier 61 rotates a spindle motor 62 of the machine tool at a rotation speed designated by the command, thereby driving a tool. A pulse encoder 63 is coupled to the spindle motor 62 with a gear or a belt, for example. The pulse encoder 63 outputs a feedback pulse in synchronization with the rotation of a spindle. The feedback pulse passes through the bus 20 to be read by the CPU 11.

Figure 2:
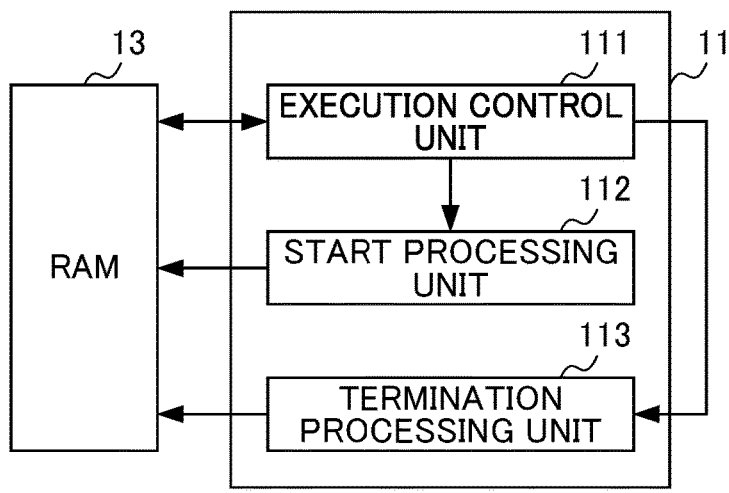
FIG. 2 is a block diagram illustrating the functional configuration of a CPU in the numerical controller according to the present embodiment.

FIG. 2 is a block diagram illustrating the functional configuration of the CPU 11 in the numerical controller 1 according to the present embodiment. The CPU 11 includes an execution control unit 111, a start processing unit 112, and a termination processing unit 113 as newly included function units. Each of these function units is realized when the CPU 11 executes a system program (control program) stored in the ROM 12.

The execution control unit 111 executes a machining program for controlling the operation of the machine tool from the beginning or from the block designated by an operator. In the machining program read into the RAM 13, a cursor is placed on the block under execution, and by moving the position of the cursor, an operator can start (start a cycle of) the execution of the machining program from a freely-selected block.

When a subsequence called from a predetermined block in the machining program is started, the start processing unit 112 sets a flag indicating that the subsequence is under execution. More specifically, in the case where the block to be executed next is the block from which a subsequence is called, the start processing unit 112 regards the start of the execution of this block as the start of the subsequence and sets the flag at this timing.

The termination processing unit 113 resets the flag when the called subsequence is terminated. More specifically, the termination processing unit 113 regards the state where the execution of the block from which a subsequence was called has been normally terminated without any interruption as the termination of the subsequence and resets the flag at this timing.

When the execution control unit 111 is instructed, following interruption of the execution of the machining program, to restart the machining program from a block succeeding the predetermined block from which the subsequence was called, if the flag is set, the execution control unit 111 suspends the execution of the machining program. Here, the execution control unit 111 outputs an alert indicating that the subsequence has not been terminated yet. Alternatively, the execution control unit 111 may automatically execute the machining program from a predetermined block at which the subsequence has not been terminated yet.

The flags may be provided individually for each block in the machining program. In this case, when the execution control unit 111 is instructed to restart the machining program, if the flag associated with a block preceding the designated block is set, the execution control unit 111 suspends the execution of the machining program.

Figure 3:
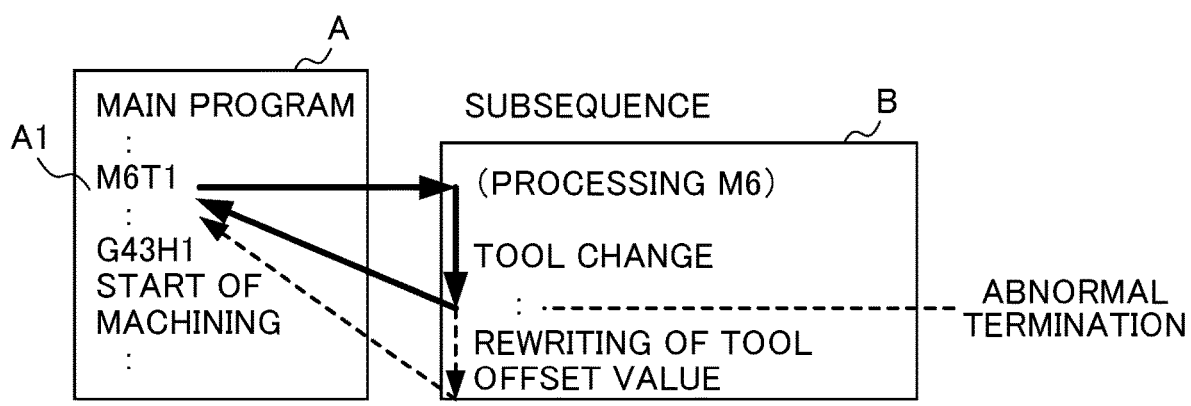
FIG. 3 is a diagram illustrating a case in which a machining program according to the present embodiment is re-executed.

FIG. 3 is a diagram illustrating a case in which the machining program according to the present embodiment is re-executed. A subsequence B is called from a predetermined block A1 in a main program A. In this case, tool change is instructed in the block A1, and a series of operations relating to tool change are performed in the subsequence B. In the subsequence B, a plurality of operations, such as rewriting of a tool offset value, are performed in addition to the actual operation of the tool change, but when these operations are interrupted due to operation by an operator, the issuance of alarm, or the like, it has been difficult for an operator to determine whether or not all of these multiple operations have been completed.

For example, in the case where failure occurs after the tool change and the subsequence B is interrupted abnormally, the operator may erroneously determine that the tool change has been completed, restarting the main program A from the block next to the block A1. Then, the rewriting of the tool offset value, which is the operation to be executed originally indicated by a broken-line arrow in the figure, is not executed, resulting in a failure in interference. The numerical controller 1 informs the operator of whether or not the series of operations in the subsequence B has been completed.

FIG. 4 is a first flowchart illustrating a control method to be executed by the numerical controller 1 according to the present embodiment. In the present example, the numerical controller 1 alerts the operator that there is an interrupted subsequence.

In step S1, the execution control unit 111 accepts the block from which the execution of the machining program is started, in response to the start instruction issued by an operator. Specifically, the block at which a cursor is placed in the machining program becomes the start position in step S2, the execution control unit 111 determines whether or not a flag associated with a block preceding the start position is set to ON. If the determination is YES, the processing shifts to step S3, and if the determination is NO, the processing shifts to step S4.

In step S3, since the subsequence to be executed preceding the designated block is incomplete, the execution control unit 111 outputs an alert to urge an operator to re-execute the block for which the flag is set to ON and terminates the processing.

In step S4, the execution control unit 111 reads the block to be executed and analyzes the command code. In step S5, the execution control unit 111 determines whether or not the block to be executed is a block from which a subsequence is called. If the determination is YES, the processing shifts to step S6, and if the determination is NO, the processing shifts to step S7.

In step S6, the start processing unit 112 sets the flag indicating that the subsequence has been started to ON. In step S7, the execution control unit 111 executes the target block.

In step S8, the execution control unit 111 determines whether or not the processing program has been interrupted preceding the completion of the processing of the target block. If the determination is YES, the processing is terminated, and if the determination is NO, the processing shifts to step S9.

In step S9, since the subsequence has been terminated without any interruption, the termination processing unit 113 resets the flag set in step S6 to OFF. In step S10, the execution control unit 111 determines whether or not the machining program has been terminated. If the determination is YES, the processing is terminated, and if the determination is NO, the processing shifts to step S4 and the cursor position moves to the next block.

FIG. 5 is a second flowchart illustrating a control method to be executed by the numerical controller 1 according to the present embodiment. In the present example, the numerical controller 1 automatically executes the interrupted subsequence.

In step S11, the execution control unit 111 accepts the block from which the execution of the machining program is started, in response to the start instruction issued by an operator. Specifically, the block at which the cursor is placed in the machining program becomes the start position. In step S12, the execution control unit 111 determines whether or not a flag associated with a block preceding the start position is set to ON. If the determination is YES, the processing shifts to step S13, and if the determination is NO, the processing shifts to step S14.

In step S13, since the subsequence to be executed preceding the designated block is incomplete, the execution control unit 111 moves the cursor to the block from which the subsequence is called. Accordingly, the execution control unit 111 can re-execute the incomplete subsequence.

The processing in step S14 and the subsequent steps thereof is common to that in step S4 and the subsequent steps in the first flowchart of FIG. 4. The numerical controller 1 executes the machining program sequentially from the designated block or the block from which an incomplete subsequence is called.

According to the present embodiment, by setting the flag at the time of the start of the subsequence and resetting it at the time of the termination, the numerical controller 1 determines whether or not the subsequence has been interrupted at the time of the restarting of the machining program. In this way, if the subsequence to be completed is midway through execution at the time of the restarting of the machining program, the numerical controller 1 can suspend the execution of the machining program. Accordingly, the numerical controller 1 can accept the correct restarting position of the machining program, thereby normally restarting the execution of the machining program. As a result, the numeric controller 1 can prevent unexpected machining defects as well as accidents due to erroneous operation by an operator or the like.

By determining the start and the termination of a subsequence based on the start and the normal termination of the block from which the subsequence was called, the numerical controller 1 can appropriately set and reset the flag even when the numerical controller 1 cannot refer to the code of the subsequence.

In the case where the flag is set upon the instruction to restart the machining program, the numerical controller 1 can output the alert indicating that the subsequence has not been terminated yet, thereby accepting the operation by the operator again and restarting the machining program from the correct block. Alternatively, in the case where the flag is set upon the instruction to restart the machining program, the numerical controller 1 automatically executes the block from which the subsequence is called, thereby omitting the operation by the operator to improve convenience.

Here, a plurality of the flags each indicating that the subsequence is midway through execution may be provided to respective blocks in the machining program, and when the numerical controller 1 is instructed to restart the machining program, if the flag associated with a block preceding the designated block is set, the numerical controller 1 suspends the execution of the machining program. Accordingly, the numerical controller 1 specifies the subsequence to be completed by the time the machining program is restarted from among a plurality of the subsequences to be called, and can suspend the execution of the machining program if the specified subsequence is midway through execution. In this manner, the numerical controller 1 can normally restart the execution of the machining program by urging an operator to perform reoperation or by automatic execution.

Although the embodiment of the present invention has been described so far, the present invention is not limited to the embodiment described above. Further, the effects described in the present embodiment are listed merely as the most preferable effects produced by the present invention, and the effects produced by the present invention are not limited to those described in the present embodiment.

Although the numerical controller 1 determines the termination of the subsequence based on the normal termination of the block on the calling side, the present invention is not limited to this determination method. In the case where the numerical controller 1 can refer to the code of the subsequence to be executed, such as the case where the subsequence is described as a subprogram (subroutine) in the machining program, the numerical controller 1 may reset the flag upon detecting the execution of a predetermined code, such as a code (M99) indicating the termination of the subprogram. Similarly, although in the above-described embodiment the numerical controller 1 determines the start of the subsequence based on the start of the execution of the block on the calling side, the present invention is not limited to this determination method. In the case where the numerical controller 1 can refer to the code of the subsequence to be executed, the numerical controller 1 may set the flag upon detecting the execution of a predetermined code, such as a code indicating the start of the subprogram or the first code.

The control method to be executed by the numerical controller 1 is realized by software. In the case where the control method is realized by software, programs included in the software are installed in a computer. These programs may be distributed to a user stored in a removable medium, or may be distributed to a user by way of downloading to a user's computer via a network.

EXPLANATION OF REFERENCE NUMERALS

1 NUMERICAL CONTROLLER (CONTROL DEVICE)
11 CPU
111 EXECUTION CONTROL UNIT
112 START PROCESSING UNIT
113 TERMINATION PROCESSING UNIT

What is claimed is:

1. A control device comprising:
a memory configured to store a program; and
a processor configured to execute the program and control the control device to:
execute a machining program for controlling operation of a machine tool from a designated block;
set, in response to start of an operation of a subsequence called from a predetermined block in the machining program, a flag indicating that the subsequence is under execution; and
reset the flag only in response to a termination of the operation of the subsequence without any interruption, wherein
in response to an instruction being issued to restart the machining program from a block succeeding the predetermined block, wherein the instruction to restart the machining program is issued following an interruption of execution of the machining program, the processor is further configured to execute the program and control the control device to:
determine whether or not the execution of the machining program was interrupted during execution of the subsequence, the determination being based on whether or not the flag is set at a time when the instruction is issued to restart the machining program from the block succeeding the predetermined block, wherein
in response to a determination that the flag is set at the time when the instruction is issued to restart the machining program from the block succeeding the predetermined block, the control device (i) determines that the machining program was interrupted during execution of the subsequence, and (ii) suspends the execution of the machining program, and
in response to a determination that the flag is not set at the time when the instruction is issued to restart the machining program from the block succeeding the predetermined block, the control device (i) determines that the machining program was not interrupted during execution of the subsequence, and (ii) does not suspend the execution of the machining program.

2. The control device according to claim 1, wherein the processor is configured to execute the program and control the control device to regard a start of execution of the predetermined block as the start of the subsequence and set the flag.

3. The control device according to claim 1, wherein the processor is configured to execute the program and control the control device to set the flag when execution of a predetermined code in the subsequence is detected.

4. The control device according to claim 1, wherein the processor is configured to execute the program and control the control device to regard normal termination of the predetermined block as the termination of the subsequence and reset the flag.

5. The control device according to claim 1, wherein when execution of a predetermined code in the subsequence is detected, the flag is reset.

6. The control device according to claim 1, wherein when the instruction is issued to restart the machining program, and if the flag is set, an alert is output indicating that the subsequence is not terminated yet.

7. The control device according to claim 1, wherein when the instruction is issued to restart the machining program, and if the flag is set, the machining program is automatically executed from the predetermined block from which the subsequence is called.

8. The control device according to claim 1, wherein the flag is provided for each block in the machining program, and
when the instruction is issued to restart the machining program, and if the flag associated with a block preceding the designated block is set, the execution of the machining program is suspended.

9. A control method to be executed by a computer, the control method comprising the steps of:
an execution control step of executing a machining program for controlling operation of a machine tool from a designated block;
a start processing step of setting, in response to start of an operation of a subsequence called from a predetermined block in the machining program, a flag indicating that the subsequence is under execution; and
a termination processing step of resetting the flag only in response to a termination of the operation of the subsequence without any interruption, wherein
in response to an instruction being issued to restart the machining program from a block succeeding the predetermined block, wherein the instruction to restart the machining program is issued following an interruption of execution of the machining program, the control method further comprises:
determining whether or not the execution of the machining program was interrupted during execution of the subsequence, the determination being based on whether or not the flag is set at a time when the instruction is issued to restart the machining program from the block succeeding the predetermined block, wherein
in response to a determination that the flag is set at the time when the instruction is issued to restart the machining program from the block succeeding the predetermined block, the control method further comprises (i) determining that the machining program was interrupted during execution of the subsequence, and (ii) suspending the execution of the machining program, and
in response to a determination that the flag is not set at the time when the instruction is issued to restart the machining program from the block succeeding the predetermined block, the control method further comprises (i) determining that the machining program was not interrupted during execution of the subsequence, and (ii) not suspending the execution of the machining program.

10. A non-transitory computer readable medium configured to store a control program to make a computer execute a control method comprising the steps of:
an execution control step of executing a machining program for controlling operation of a machine tool from a designated block;
a start processing step of setting, in response to start of an operation of a subsequence called from a predetermined block in the machining program, a flag indicating that the subsequence is under execution; and
a termination processing step of resetting the flag only in response to a termination of the operation of the subsequence without any interruption, wherein
in response to an instruction being issued to restart the machining program from a block succeeding the predetermined block, wherein the instruction to restart the machining program is issued following an interruption of execution of the machining program, the control method further comprises:
determining whether or not the execution of the machining program was interrupted during execution of the subsequence, the determination being based on whether or not the flag is set at a time when the instruction is issued to restart the machining program from the block succeeding the predetermined block, wherein
in response to a determination that the flag is set at the time when the instruction is issued to restart the machining program from the block succeeding the predetermined block, the control method further comprises (i) determining that the machining program was interrupted during execution of the subsequence, and (ii) suspending the execution of the machining program, and
in response to a determination that the flag is not set at the time when the instruction is issued to restart the machining program from the block succeeding the predetermined block, the control method further comprises (i) determining that the machining program was not interrupted during execution of the subsequence, and (ii) not suspending the execution of the machining program.

* * * * *